L. AND F. PIGNANI.
HOIST.
APPLICATION FILED JULY 23, 1921.
1,425,792. Patented Aug. 15, 1922.
3 SHEETS—SHEET 1.
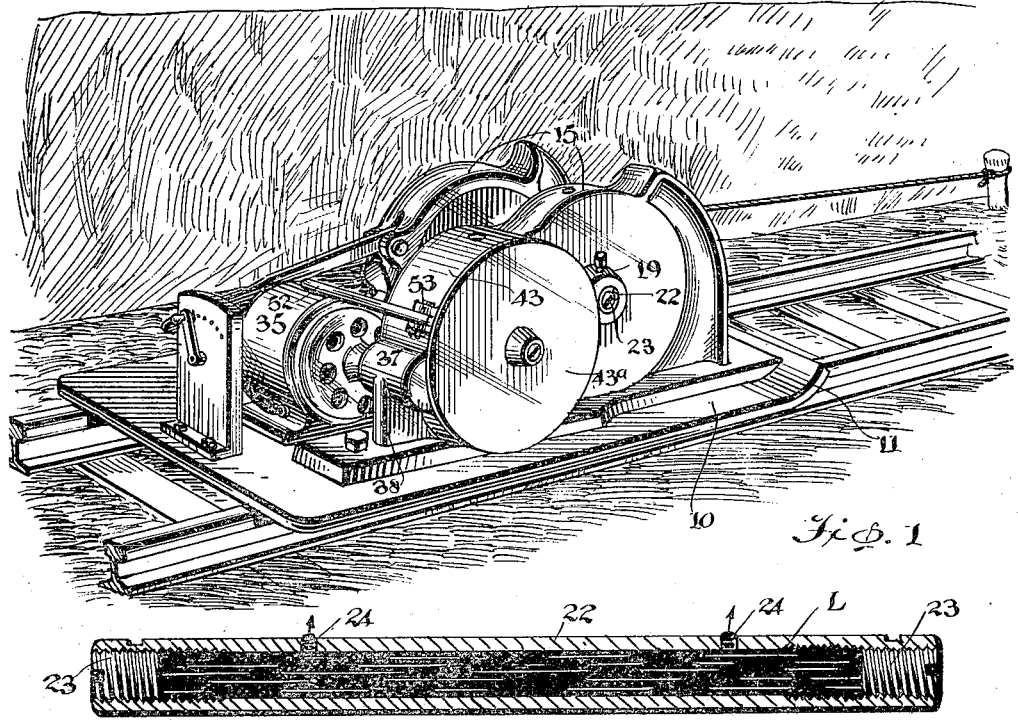
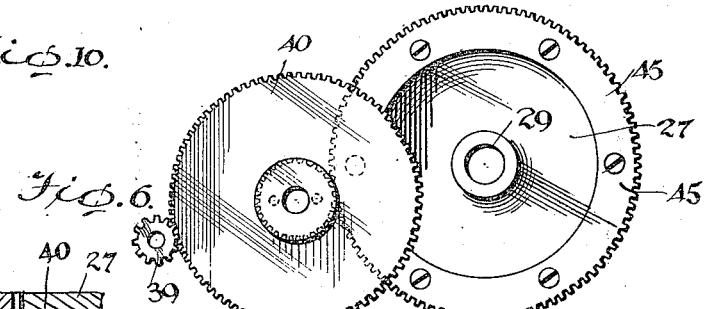
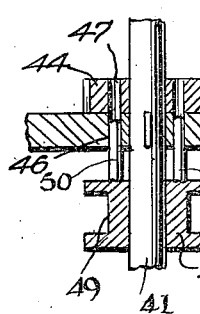
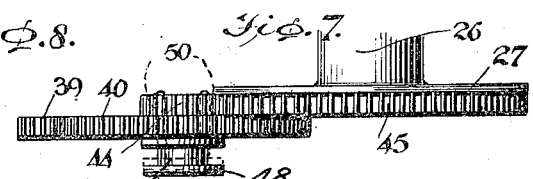
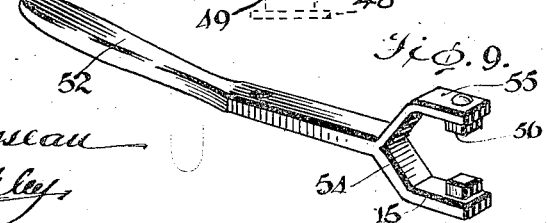
L. Pignani,
F. Pignani,
INVENTORS

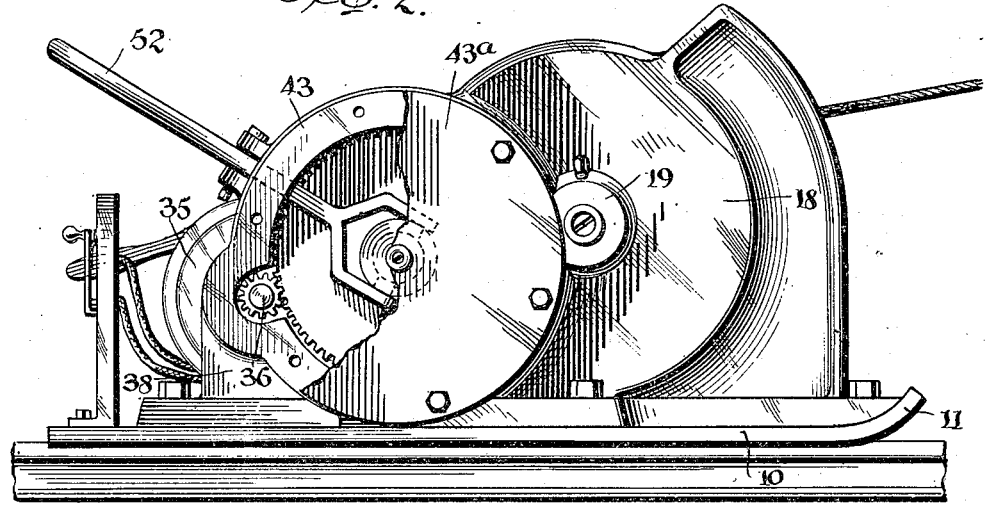
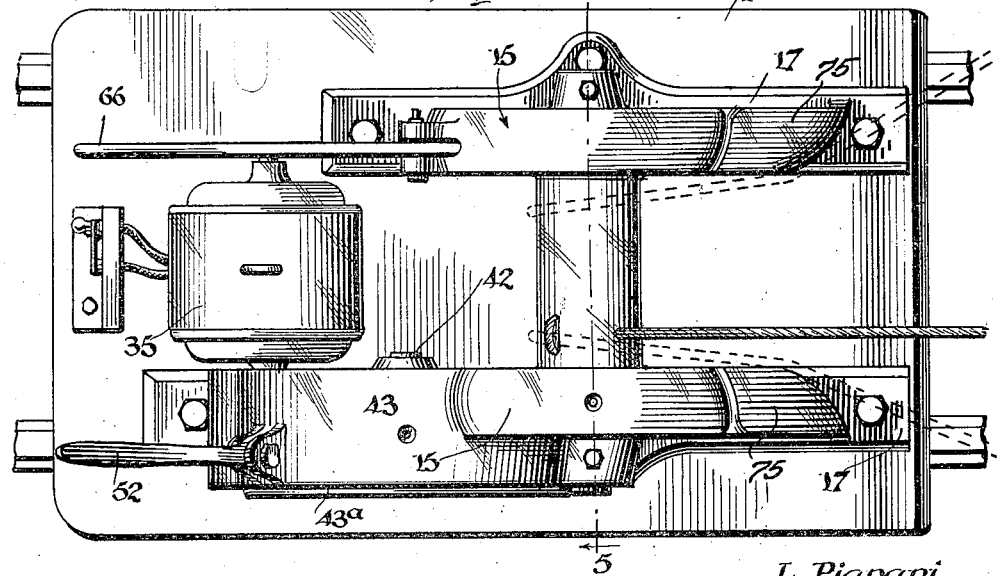
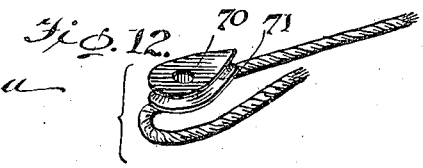

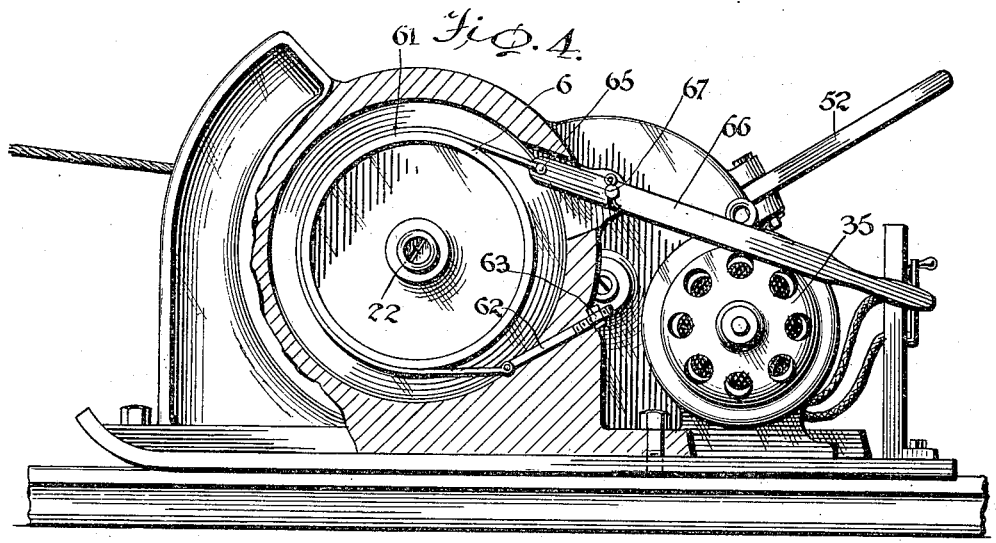
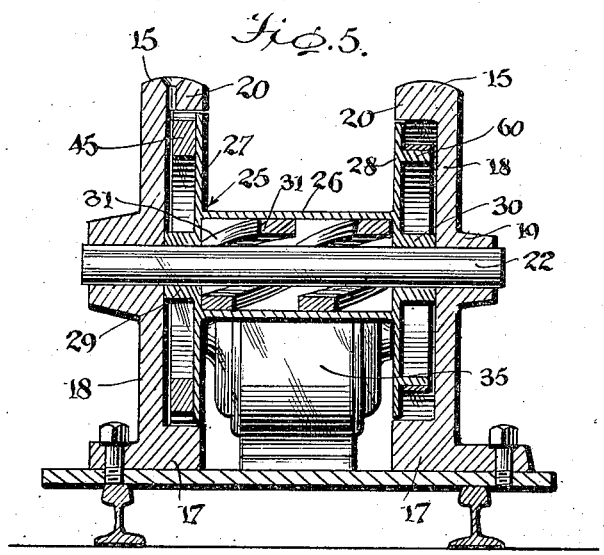
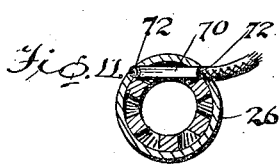

UNITED STATES PATENT OFFICE.

LAWRENCE PIGNANI AND FRANK PIGNANI, OF BLAIRSVILLE, PENNSYLVANIA.

HOIST.

1,425,792.  Specification of Letters Patent.  Patented Aug. 15, 1922.

Application filed July 23, 1921. Serial No. 486,992.

*To all whom it may concern:*

Be it known that we, LAWRENCE PIGNANI and FRANK PIGNANI, citizens of the United States, and residents of Blairsville, in the county of Indiana and State of Pennsylvania, have invented certain new and useful Improvements in Hoists, of which the following is a specification.

The present invention relates to improvements in hoists.

The object of the invention is to provide an improved hoist which is of simple and durable construction, reliable in operation and easy and inexpensive to manufacture; which gives a proper lead to the cable or cables; which is so constructed and organized as not to be liable to injury by virtue of the cables becoming entangled with the moving mechanism of the hoist, by reason of the cables being given improper lead or becoming broken or by reason of other causes; which is easily controllable by the operator without the necessity of the operator assuming a dangerous relation with respect to the moving parts of the machine; which is organized with an improved brake mechanism; which may be easily replaced or repaired and which is easily transported or moved from place to place.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a perspective view of the hoist embodying the present invention;

Figure 2 is a side elevational view thereof, parts being broken away for the sake of illustration;

Figure 3 is a plan view;

Figure 4 is a side elevational view of the opposite side of the hoist from that shown in Figure 2, parts being broken away and shown in section for the sake of illustration;

Figure 5 is a view in transverse vertical section on line 5—5 of Figure 3;

Figure 6 is a detail view in side elevation of the gearing;

Figure 7 is a plan view thereof;

Figure 8 is a detail view, partly in section and partly in elevation of the clutch mechanism for the gearing;

Figure 9 is a detail perspective view of the shifting lever for the clutch;

Figure 10 is a detail view in transverse section of the hollow axle of the winding drum;

Figure 11 is a detail view in transverse section of the hub of the winding drum illustrating the anchoring means for the cable end; and Figure 12 is a detail perspective view of the anchoring block of this anchoring means.

Referring to the drawings wherein for the sake of illustration is shown the preferred embodiment of the invention, the numeral 10 designates the bed plate of the hoist which is preferably constructed of heavy boiler plate and which has its forward end upturned, as at 11, to facilitate the sliding of the hoist structure when it is desired to move the same from place to place.

Spaced bearings, designated generally at 15, are arranged upon the base adjacent the opposite sides thereof and in parallel relation with respect to each other. These spaced bearings are in the main identical in construction and each includes an elongated base 17 from which a circular bearing plate 18 upstands. Preferably the circular bearing plate is integral with the elongated base. The bearing plate includes a hub 19 constituting a bearing and is provided with an annular flange 20 extending laterally inward from its marginal edge and having its lower portion merging into the elongated base. The bearing plates as well as their hubs and flanges are alined and in the alined hubs the hollow axle 22 is arranged. This hollow axle is of elongated cylindrical form and is adapted to contain a supply of lubricant, designated at L in Figure 10. The open ends of the hollow axle are closed by plugs 23 having threaded engagement with the interior of the hollow axle and intermediate its ends the hollow axle is provided with a plurality of lubricant discharge orifices 24.

A winding drum designated generally at 25 is rotatably mounted upon the hollow axle and includes a hub 26 having cheek plates 27 and 28 and bearings 29 and 30 by which the drum is mounted on the axle. The bearings 29 and 30 are spaced radially inward from the hub 26 of the winding drum and define a chamber for receiving curved lubricant distributors 31 which are cooperably arranged with respect to the axle for distributing the lubricant delivered from the discharge orifices 24. In the assembly the cheek plates 29 have their inner faces co-planer with the inner faces of the flanges 20 as most clearly shown in Figure 5, the hubs 29 and 30 serving to properly space the cheek plates 27 and 28 from their respective bearing plates for this purpose.

The electric motor 35 is arranged on the bed plate to the rear of the winding drum and its bearings, and has its armature 36 rotatably journaled in a bearing 37 provided at the upper end of the pedestal 38. Gearing is provided for transmitting motion from the armature of the electric motor to the winding drum and includes a pinion 39 fixed to the armature and constantly meshing with a large gear wheel 40 secured to an intermediate shaft 41 rotatably journaled in suitable bearings 42 provided therefor in the gearing casing 42. A small gear 44 is loosely mounted on the shaft 41 adjacent the large gear 40 and constantly meshes with a ring gear 45 bolted or otherwise suitably secured to the cheek plate 27 of the winding drum. The ring gear 45 operates in the enclosed chamber or cavity defined by the cheek plate 27 and its hub 29 and the bearing plate 18 and its flange 20.

Clutch mechanism is provided for clutching the small gear 44 to the gear 40 when desired and for this purpose the large gear wheel 40 is provided with transverse openings 46 adapted to be alined with arcuate openings 47 provided in the small gear wheel 44. A collar 48 is shiftably mounted on the shaft 41 and is provided with an annular groove 49 in its periphery. The collar carries a plurality of laterally extended pins 50 which are accommodated in the openings 46 of the large gear wheel 40 and are adapted to be shifted into and out of the openings 47 of the small gear 44 thus clutching or unclutching the small gear wheel 44 as desired. A shifting lever 52 is pivotally mounted on the gear casing as at 53 and is provided with a fork 54, the arms 55 of which carry pivoted blocks 56 which are operatively engaged in the annular groove 49 of the collar 48. This shifting lever 52 extends rearwardly from the gear casing 43, so that the motion of the hoist may be controlled by the operator without it being necessary for him to occupy a dangerous relation with respect to the moving parts of the hoist. The gear casing 43 is provided with a removable side plate 43ᵃ to facilitate access to the gearing for the purposes of lubrication, replacement and repair. The balance of the construction of the gear casing is integrally formed with adjacent bearing 15 and emerges therein.

A brake drum 60 is secured to the cheek plate 28 and is thus accommodated in the enclosed chamber or cavity defined by the cheek plate 28 and its hub 30 and the adjacent bearing plate 18 and its hub 20. A brake band 61 coacts with the brake and includes an anchor bolt 62 adjustably mounted in the adjacent bearing plate by means of a nut 63 threaded on the end of the anchor bolt. The other end of the brake band is pivotally connected, as at 64, to a vertically movable operated lever 66 pivoted, as at 67, to the adjacent flange 20. The weight of the lever 66 is operative and is effective to release the brake band from braking engagement from the brake drum 60. This operating lever like the laterally shiftable lever of the clutch extends rearwardly from the winding drum and its bearings and may be controlled by the operator without the necessity of his occupying a dangerous relation with respect to the moving parts of the hoist.

Anchoring means is provided for securing the ends of the cable to the hub of the winding drum and includes an anchoring block 70 having a peripheral groove 71 receiving the end of the cable and itself being located within the hub of the winding drum as clearly shown in Figure 11, the hub having openings 72 accommodating the ends of the anchor block and permitting the extension or disposition of the cable therearound. The anchor block is generally of wedge shape and the arrangement is such that the tension of the cable is effective to more firmly seat the anchor block and to more firmly secure the cable.

Guides 75 are carried by the spaced bearing 15 and preferably are integral with the bearings. They flare outwardly and guide the cable when it takes an angular lead from the drum.

In operation, when it is desired to have the winding drum partake of a winding motion it is only necessary to shift the lever 52 so as to project the pins 50 into the openings 47 of the small gear wheel 44. This clutches the small gear wheel 44 to the gear 40 and constrains it to move with this shaft, the motor having been started to drive the shaft through the pinion 39 and large gear wheel 40. The small gear 44 when thus clutched to the gear drives the ring gear 45 which being fixed to the cheek plate of the winding drum drives the winding drum to wind the cable thereon. When the winding motion is to be stopped the clutch lever is shifted to retract or withdraw the pins 46 from the openings 47 and thus unclutch the small gear from the gear 40 and the brake is then applied by lifting upwardly on the operating lever 66. When the winding drum is stopped the drum is released by merely letting go of the operating lever 66 which drops of its own weight and utilizes its own weight to move the brake band out of braking engagement with the brake drum.

We claim:

1. In a hoist, a bed plate, spaced bearings on the bed plate, each including an elongated base and a circular bearing plate having an inwardly and laterally extending marginal flange, a hollow axle journaled in the bearing plates, a winding drum including a hub having bearings rotatably mounted on the hollow axle, and cheek plates rotatably mounted within the flanges, said cheek plates, said bearing plate and said flanges defining chambers, an electric motor including an armature, a pedestal having a bearing rotatably supporting said armature, a gear casing between said bearing and one of said spaced plates, gearing arranged in said gear casing for transmitting the motion from said electric motor to said winding drum and including a pinion fixed to the armature, a shaft journaled in the gear casing, a large gear fixed to said shaft and constantly meshing with said pinion, a small gear loosely mounted on said shaft, means for clutching said small gear to said large gear, and a ring gear fixed to the adjacent cheek plate of the winding drum operating in the adjacent chamber and constantly meshed with the small gear, a brake drum carried by the other cheek plate and operating in its adjacent chamber, a brake band cooperable with said brake drum, an operating lever for said brake band extending rearwardly from the winding drum, and guides for the cable carried by the spaced bearings.

2. In a hoist, a bed plate, spaced bearings carried by said bed plate and each including a base, a circular bearing plate upstanding from the base and inwardly extending lateral marginal flanges carried by the bearing plates, a winding drum mounted on said spaced bearings and including cheek plates rotatably received within and coplaner with the marginal flanges, said cheek plates and circular bearing plates defining chambers, a ring gear fixed to one of said cheek plates and operating in the adjacent chamber, a brake drum fixed to the other of said cheek plates and operating in this adjacent chamber, an electric motor arranged to the rear of the winding drum, gearing for driving the ring gear from the electric motor and including a clutch, an operating lever for the clutch extending rearwardly from the winding drum, braking mechanism cooperable with the brake drum and an operating lever therefor extending rearwardly from the winding drum.

3. In a hoist, a bed plate, spaced bearings on the bed plate, each including an elongated base and a circular bearing plate having an inwardly and laterally extending marginal flange, a hollow axle journaled in the bearing plates, a winding drum including a hub having bearings rotatably mounted on the hollow axle, and cheek plates rotatably mounted within the flanges, said cheek plates, said bearing plate and said flanges defining chambers, an electric motor including an armature, a pedestal having a bearing rotatably supporting said armature, a gear casing between said bearing and one of said spaced plates, gearing arranged in said gear casing for transmitting the motion from said electric motor to said winding drum and including a pinion fixed to the armature, a shaft journaled in the gear casing, a large gear fixed to said shaft and constantly meshing with said pinion, a small gear loosely mounted on said shaft, means for clutching said small gear to said large gear, and a ring gear fixed to the adjacent cheek plate of the winding drum operating in the adjacent chamber and constantly meshed with the small gear, a brake drum carried by the other cheek plate and operating in its adjacent chamber, and a brake band cooperable with said brake drum, and an operating lever for said brake band extending rearwardly from the winding drum.

4. In a hoist, a bed plate, spaced bearings on the bed plate, each including an elongated base and a circular bearing plate having an inwardly and laterally extending marginal flange, a hollow axle journaled in the bearing plates, a winding drum including a hub having bearings rotatably mounted on the hollow axle, and cheek plates rotatably mounted within the flanges, said cheek plates, said bearing plate and said flanges defining chambers, means for driving said winding drum including a ring gear fixed to one of said cheek plates and operating in its adjacent chamber and braking mechanism for said winding drum including a brake drum carried by the other of said cheek plates and operating in its chamber.

5. In a hoist, a bed plate, spaced bearings on said bed plate, each including a base and a bearing plate on said base having an inwardly and laterally extending flange, a winding drum rotatably mounted on said bearing plates and including cheek plates rotatably mounted within the flanges, said cheek plates, said bearing plates, and said flanges defining chambers, means for driving said winding drum including a ring gear secured to one of said cheek plates and operating in the chamber, a motor, a gear casing between said motor and the cheek plate to which the ring gear is secured and gearing between said motor and said ring gear, and braking mechanism for the winding drum including a brake drum secured to the other of said cheek plates and operating in said chamber.

LAWRENCE PIGNANI.
FRANK PIGNANI.